(12) United States Patent
Althouse et al.

(10) Patent No.: US 7,494,521 B2
(45) Date of Patent: Feb. 24, 2009

(54) TRIGGER MECHANISM FOR DUST FILTER PULSE CLEANING SYSTEM

(76) Inventors: Michael D. Althouse, 1004 S. 14th St., Sabetha, KS (US) 66534; Richard Newbolt, 1609 Sunset Dr., Sabetha, KS (US) 66534

( * ) Notice: Subject to any disclaimer, the term of this patent is extended or adjusted under 35 U.S.C. 154(b) by 236 days.

(21) Appl. No.: 11/257,519

(22) Filed: Oct. 25, 2005

(65) Prior Publication Data
US 2006/0086070 A1    Apr. 27, 2006

Related U.S. Application Data

(60) Provisional application No. 60/622,120, filed on Oct. 26, 2004.

(51) Int. Cl.
*B01D 39/00* (2006.01)
*B01D 41/00* (2006.01)

(52) U.S. Cl. .......................................... 55/294; 55/287
(58) Field of Classification Search ................... 55/294, 55/273, 287
See application file for complete search history.

(56) References Cited

U.S. PATENT DOCUMENTS 4,655,799 A * 4/1987 Bosworth et al. ............. 96/427

* cited by examiner

*Primary Examiner*—Walter D Griffin
*Assistant Examiner*—Amber Miller Harris
(74) *Attorney, Agent, or Firm*—Shughart Thomson & Kilroy PC

(57) ABSTRACT

A trigger mechanism for a dust filter pulse cleaning system includes a trigger frame, a trigger valve assembly including a reciprocating valve member having a valve head resiliently urged toward a valve seat and a striker head at an opposite end, a trigger arm pivotally connected to the trigger frame and including a cam follower, a twin lobed trigger cam journaled on the trigger frame and engaging the cam follower, and a pinion gear joined to the trigger cam and adapted for engagement with a fixed spur gear mounted coaxially with a rotary pulse cleaning air distribution arm extending from a rotary air tank. The trigger mechanism is mounted on the air tank and rotates therewith. An air release conduit is connected to the trigger valve and causes the opening of a main diaphragm valve to release air pulses from the air tank when pressure is released from the release line. Compressed air within the release line also acts to urge the valve head against the valve seat. The release valve is opened by engagement of the cam lobes with the cam follower, thereby releasing compressed air from the release line.

9 Claims, 3 Drawing Sheets

TRIGGER MECHANISM FOR DUST FILTER PULSE CLEANING SYSTEM

CROSS-REFERENCE TO RELATED APPLICATION

This application claims priority under 35 U.S.C. 119(e) and 37 C.F.R. 1.78(a)(4) based upon U.S. Provisional Application Ser. No. 60/622,120 filed Oct. 26, 2004 for FIRING MECHANISM FOR PULSE CLEANING SYSTEM FOR DUST FILTERS.

BACKGROUND OF THE INVENTION

The present invention is directed to controls for air pulse type cleaners for bag type or cartridge type filter systems and, more particularly, to a trigger or indexing mechanism for such a system which is entirely mechanical.

Bag type air filter systems are used in dusty environments to remove particulates in industrial operations in which the dust can be an explosion or health hazard or damaging to equipment or manufactured products or simply environmentally undesirable. In a typical bag type filter system, sometimes referred to as a baghouse filter system, dust laden air is passed through a dusty air plenum having a plurality of filter bags supported by frames or cages. The filter bags are made of a fabric, paper, or the like and trap dust particles on their external surfaces, with the cleaned air exiting from the insides of the bags into a clean air plenum. To prevent clogging the filter bags from a layer of dust on the outer surfaces of the bags, pulses of air are periodically injected through the inner surfaces of the bags to dislodge some of the dust on the outer surfaces, which then settles to the floor of the dusty air plenum or a conveyor below the bags.

It will be appreciated that newer filter devices also are in use which can be substituted for filter bags or used in the alternative. This alternative filter medium is generally know as the filter cartridge. Such filter cartridges are comprised of a cloth or paper or synthetic filter medium which may or may not include a structural support such as a wire or plastic cage or frame or support. Throughout this specification it is to be understood that the use of the term "bag" or "bag type" or "filter bag" includes such filter cartridge units as an equivalent structure.

In a common type of bag filter arrangement, the bags are arranged in groups of a particular pattern in circumferentially spaced sectors of a cylindrical plenum. A radial distribution arm with nozzles arranged in a pattern to coincide with the positions of the bags in the sectors is rotated over the bags. A timing mechanism is synchronized in such a manner as to inject pulses of compressed air into the bags as the nozzle group passes over a group of bags. Since time is needed to refill an air tank with compressed air, the timing mechanism is arranged to skip a number of bag groups before the next group is cleaned. Thus, it takes several revolutions of the distribution arm to clean all the bags. Details of a typical arrangement of a bag filter system can be found in U.S. Pat. No. 4,655,799, which is incorporated herein by reference.

In U.S. Pat. No. 4,655,799, the air distribution arm extends radially from the air tank which is also rotated and into which compressed air is fed through a rotary union. A diaphragm type valve seats against an inner extension of the distribution arm and is operated by a secondary diaphragm valve in fluidic communication with a solenoid valve. The solenoid valve is controlled by a photoelectric cell through a counter which counts the passage of pegs on a peg wheel rotated synchronous with the rotating tank and arm and having a peg corresponding to each sector of bags. When the solenoid valve is opened, air in the secondary valve is released, thereby causing the main diaphragm valve to open temporarily against spring pressure and releasing air from the tank through the nozzles on the distribution arm. The counter controls the frequency of air pulses so that pulses are released for every third peg sensed. By this means, every third group of bags receives cleaning pulses, and if the number of sectors is not divisible by three, within three revolutions of the distribution arm, every sector group of bags will be cleaned.

The air tank is rotated in an arrangement such as the one shown in the U.S. Pat. No. 4,655,799, along with the secondary valve. For this reason, either a rotary air union is required between the secondary valve and the solenoid valve, or a rotary electrical connection is needed between the photoelectric cell and the rotated solenoid valve. Because of the complexity of such arrangements and/or the possibility of arcing at brushes of a rotary electrical connection, there is a need for a more simplified triggering mechanism for cleaning pulses for bag type filter systems.

FIG. 1 illustrates a prior art arrangement for triggering the release of cleaning pulses in a bag filter system which is entirely mechanical and which does not require rotary air or electrical connections. The trigger mechanism 200 includes a trigger frame 202 having a mounting clamp 204 slidably connected thereto. The clamp 204 is provided for securing the mechanism 200 to a shaft connected to a rotary compressed air tank so that the mechanism 200 is rotated therewith. The frame 202 has a trigger arm 206 pivotally connected at one end to the frame 202 and at the opposite end through a chain link 208 to a valve plunger 210. The valve plunger 210 is mounted for reciprocating movement and includes a valve head 212 which engages a valve seat formed within a bore 214 within the frame 202. The valve head 212 is urged toward the valve seat by a valve return spring 215 engaged between the valve head 212 and the frame 206. The bore 214 is threaded at one end to receive a fitting fluidically communicating with a pilot valve which operates a main diaphragm valve to release compressed air into a distribution arm. When the valve head 212 separates from the valve seat, pressurized air is released from the pilot valve which temporarily opens the main diaphragm valve. A pinion gear 216 is journaled on the frame 202 and has a coaxial rotary cam member 218 secured thereto and including a cam lobe 220. A cam follower roller 222 is rotatably mounted on the trigger arm 206 and is urged into engagement with the cam 218 by the valve return spring 215.

The pinion gear 216 engages a stationary spur gear mounted coaxial with the rotating air tank so that the pinion gear 216 rotates relative to the frame 216 as the tank is rotated. When the cam lobe 220 engages the follower 222, the trigger arm 206 is pivoted outward thereby drawing the valve head 212 out of seating engagement with the valve seat and releasing the pressure from the pilot valve. The gear ratio between the pinion gear 216 and the spur gear is selected to control the frequency of release of cleaning pulses. Similarly, the cam lobe 220 and frame 202 are positioned in such a manner as to synchronize opening of the valve 212 with the passage of nozzles of the distribution arm over a group of bags.

A problem with the trigger mechanism 200 is that the valve head 212 is maintained in a seated or sealed position entirely by the force of the valve return spring 215. Additionally, the relative sizing of the gears and the synchronization of the cam lobe are critical to assure that the air pulses are released at an optimum time with the nozzles centered over a group of bags or cartridges.

SUMMARY OF THE INVENTION

The present invention provides an improved trigger mechanism for dust filter pulse cleaning systems which overcomes problems with mechanisms such as the arrangement 200. The present invention provides an entirely mechanically operated trigger mechanism in which air pressure in combination with spring pressure is employed to retain a triggering valve in a seated position. Additionally, a rotary cam in the present invention is provided with a pair of cam lobes so that a pilot valve is triggered twice for each rotation of the cam, thereby enabling a rotary distribution arm to be rotated at half the speed that would otherwise be required for the same frequency of cleaning pulses. This increases the dwell time of the nozzles over each group of bags to further assure that the cleaning pulses are injected at optimum times for maximum effective cleaning air usage.

More particularly, the trigger mechanism of the present invention includes a frame or bracket with a mounting clamp slidably secured thereto. An enlarged part of the frame is bored to form an outward facing valve seat. Additionally, the bore is threaded to receive a fitting of a conduit carrying compressed air. A reciprocating trigger valve is formed by a valve plunger with a valve head at one end which is inserted through the bore to position the valve head in spaced relation with the valve seat. An opposite end of the plunger is provided with a striker head which is enlarged for engagement by a valve spring also engaged with an enlargement on the frame to urge the valve plunger in a direction to seat the valve head. The outer surface of the valve head is exposed to compressed air in the fitting such that a combination of air pressure and spring pressure urge the valve plunger in a direction to seat the valve head.

A trigger arm is pivotally mounted on the frame and has a free end engaged with the striker head of the valve plunger. A pinion gear is rotatably mounted on the frame and has a coaxial rotary cam engaging a cam follower roller mounted on the trigger arm. The cam has a pair of cam lobes on diametrically opposite sides of the cam. Whenever a cam lobe engages the cam follower, the trigger arm is pivoted to thereby urge the valve plunger in a direction to separate the valve head from the valve seat, thereby exhausting compressed air received from the fitting through a port. The pinion gear is sized in relation to a stationary spur gear to control the frequency of release of bag cleaning air pulses.

An air tank is rotatably mounted within a clean air plenum of a bag filter system and has a radial air distribution arm with a pattern of air pulse nozzles positioned to direct air into a similar pattern of filter bags arranged in groups within sectors of a dusty air plenum of the system. Within the tank, a main diaphragm valve controls flow of compressed air from the tank into the distribution arm by way of a main diaphragm which seats against an extension duct which communicates with the distribution arm. The main diaphragm is normally maintained in a seated position by a spring. The main diaphragm valve is controlled by a pilot diaphragm valve. The pilot valve receives compressed air from the main valve and, in turn, communicates compressed air to the fitting on the trigger mechanism through a trigger conduit. When pressure is released from the trigger conduit, the pilot valve opens thereby opening the main valve temporarily. While the main valve is open, compressed air exhausts from the tank into the distribution arm and out the nozzles into the bags of a sector. As the air pressure in the tank is reduced, the main valve spring returns the main diaphragm to its seated position, allowing pressure in the tank to increase for the next release.

The trigger mechanism of the present invention is clamped to a shaft mounted on a lower end of the tank by the mounting clamp so that it rotates with the tank. Engagement of the pinion gear on the trigger frame with the stationary mounted spur gear causes relative rotation of the pinion gear and, thus, the rotary cam. Thus, periodically, the lobes of the cam engage the cam follower, causing the arm to push the valve head open against the spring and air pressure. The presence of two lobes on the cam enables two air pulse releases per rotation of the pinion gear and allows the distribution arm to be rotated at half the speed which would be required for a given frequency of pulse releases with a single lobed cam.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
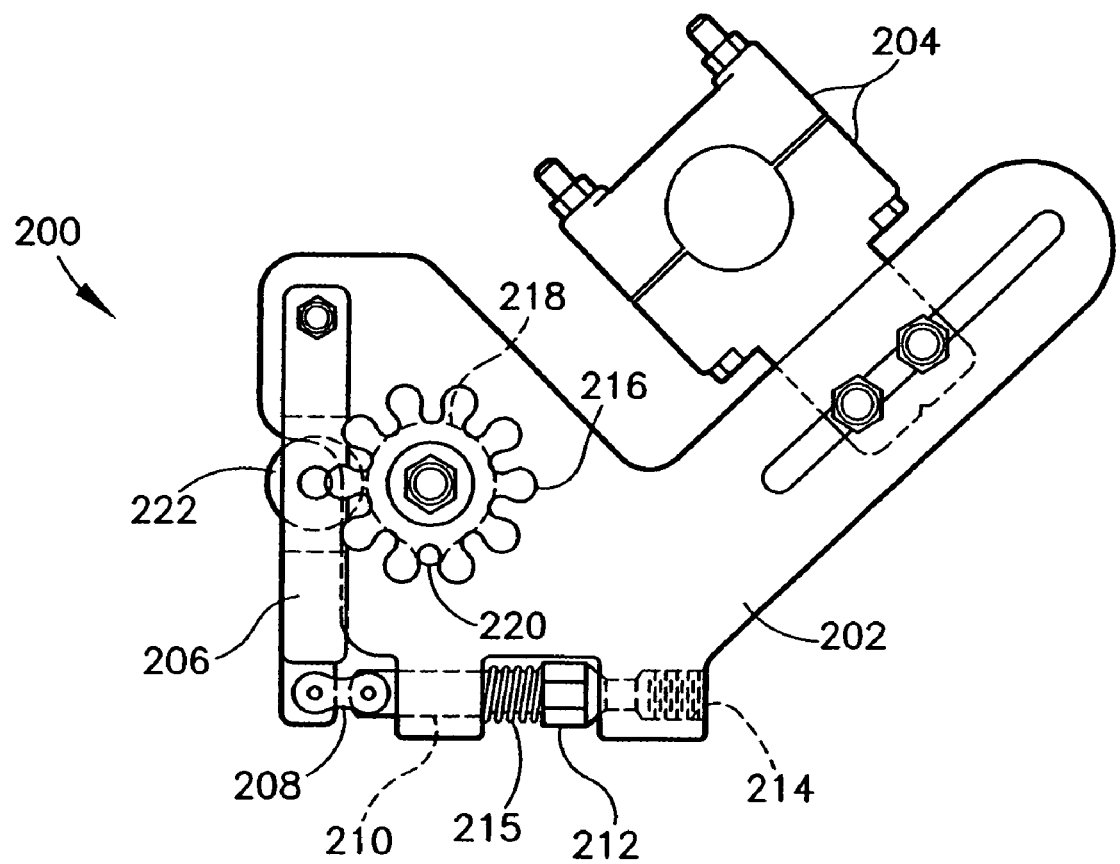
FIG. 1 is a top plan view of a prior art trigger mechanism for dust filter pulse cleaning system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a trigger mechanism for a dust filter pulse cleaning system 2 and embodying the present invention. The trigger mechanism 1 controls the release of pulses of air from the cleaning system 2 to periodically clean filter bags 4 of a bag type filter system 6.

Figure 2:
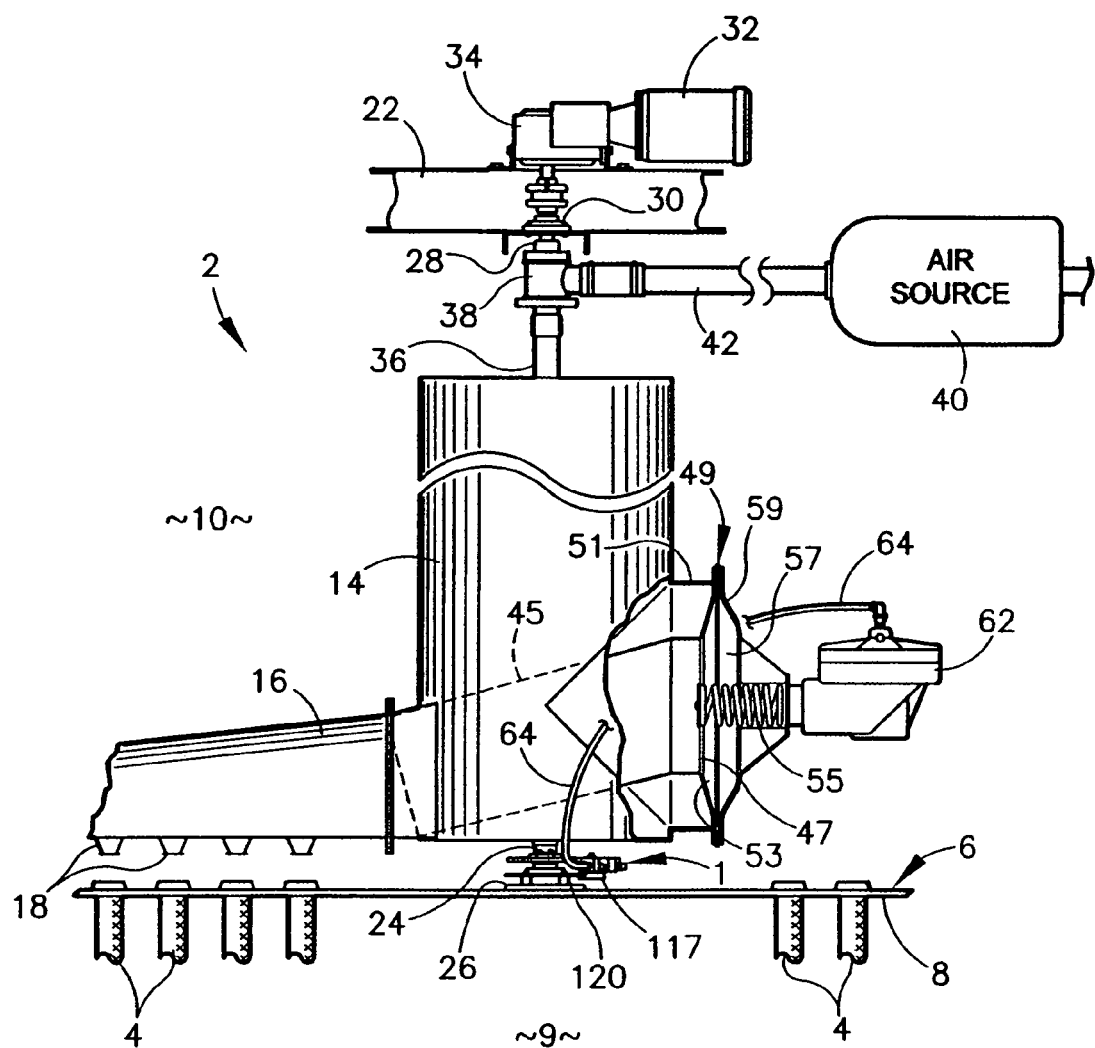
FIG. 2 is a fragmentary side elevational view of a distribution arm and compressed air tank of dust filter pulse cleaning system incorporating the trigger mechanism of the present invention.

Referring to FIG. 2, the filter system 6 includes an enclosure with a tube sheet 8 which creates a dusty or dirty air plenum 9 and a clean air plenum 10. A plurality of the fabric filter bags 4 are suspended through apertures in the tube sheet 8 into the dusty air plenum 9, supported by wire cages (not shown). Dust laden air is routed, as by fans, through the dusty air plenum and the filter bags 4 into the clean air plenum 10. Particulates within the dusty air are trapped on outer surfaces of the filter bags 4. To avoid clogging, the filter bags 4 must be periodically cleaned in some manner. Typically this is done by periodically injecting pulses in the opposite direction of normal airflow through the bags 4, that is, into the insides of the bags 4 to dislodge dust from the outer surfaces. The dust so dislodged is collected and conveyed elsewhere for disposal or some other use. Further details of bag type air filter systems can be found in U.S. Pat. No. 4,655,799.

The illustrated bag filter system 6 employs a rotary type of pulse cleaning system 2. The filter bags 4 are arranged in a particular pattern in each of a plurality of circumferentially spaced sectors formed by the tube sheet 8 which is circular. A compressed air tank 14 is rotatably mounted within the clean air plenum 10 and has an air distribution arm 16 extending radially therefrom. The arm 16 has a plurality of air injection nozzles 18 on a lower side thereof which are arranged in the same pattern as the bags 4 within a sector. The tank 14 is supported at a lower end by the tube sheet 8 and at an upper end by a beam 22 which extends across the clean air plenum 10. At the lower end, a lower shaft 24 extends from the tank 14 and is received in a lower bearing unit 26 which is mounted on the tube sheet 8. An upper shaft 28 is received in an upper bearing unit 30 mounted on the beam 22. An extension of the upper shaft 30 is engaged with a rotary motor 32 through a gear unit 34. At the upper end of the tank 14, a tubular shaft 36 extends through a rotary union assembly 38 and connects to the upper shaft 28. The assembly 38 receives compressed air from an air compressor or a positive displacement blower 40 through a conduit 42 and communicates the compressed air to the tank 14 by way of the tubular shaft 36.

The air distribution arm 16 is hollow and has an extension duct 45 extending within the air tank 14 and terminating in a main valve seat 47. A main diaphragm valve unit 49 is mounted within a radial section 51 of the tank 14 and includes a resilient main diaphragm 53 which normally is urged by a main valve spring member 55 into seating engagement with the main valve seat 47. Portions of a periphery of the main diaphragm 53 are provided with apertures (not shown in the drawing) which enable compressed air from the tank to act against the portion of the diaphragm 53 in contact with the duct 45. A main valve chamber 57 is formed between the main diaphragm 53 and an outer end wall 59 of the radial section 51. A secondary or pilot diaphragm valve 62 is in fluidic communication with the main valve chamber 57 and receives compressed air therefrom. The secondary valve 62 is constructed in a manner similar to the main valve unit 49, except on a smaller scale, and communicates compressed air from the main valve chamber 57 to a release line or conduit 64.

When compressed air is released from the release line 64, the secondary valve 62 opens to allow compressed air to exhaust therethrough by way of the release line 64. When this happens, the main diaphragm 53 is temporarily urged away from the seat 47 by the pressure differential between the periphery of the main diaphragm 53 and the reduced pressure within the main valve chamber 57. During this period, compressed air from the tank 14 enters the distribution arm 16 through the extension duct 45 and exits through the nozzles 18 into a group of filter bags 4, to thereby dislodge some of the dust therefrom. When air pressure within the tank 14 reduces to a selected level, the force of the main valve spring 55 returns the main diaphragm 53 into its seating position, allowing the tank 14 to be re-pressurized from the compressor 40. Additionally, compressed air is resupplied to the main valve chamber 57, portions of the secondary valve 62, and the release line 64. The release line 64 is connected to the trigger mechanism 1 which controls the release of compressed air therefrom. Further details of a typical rotary bag cleaning apparatus can be found in U.S. Pat. No. 4,655,799.

Figure 3:
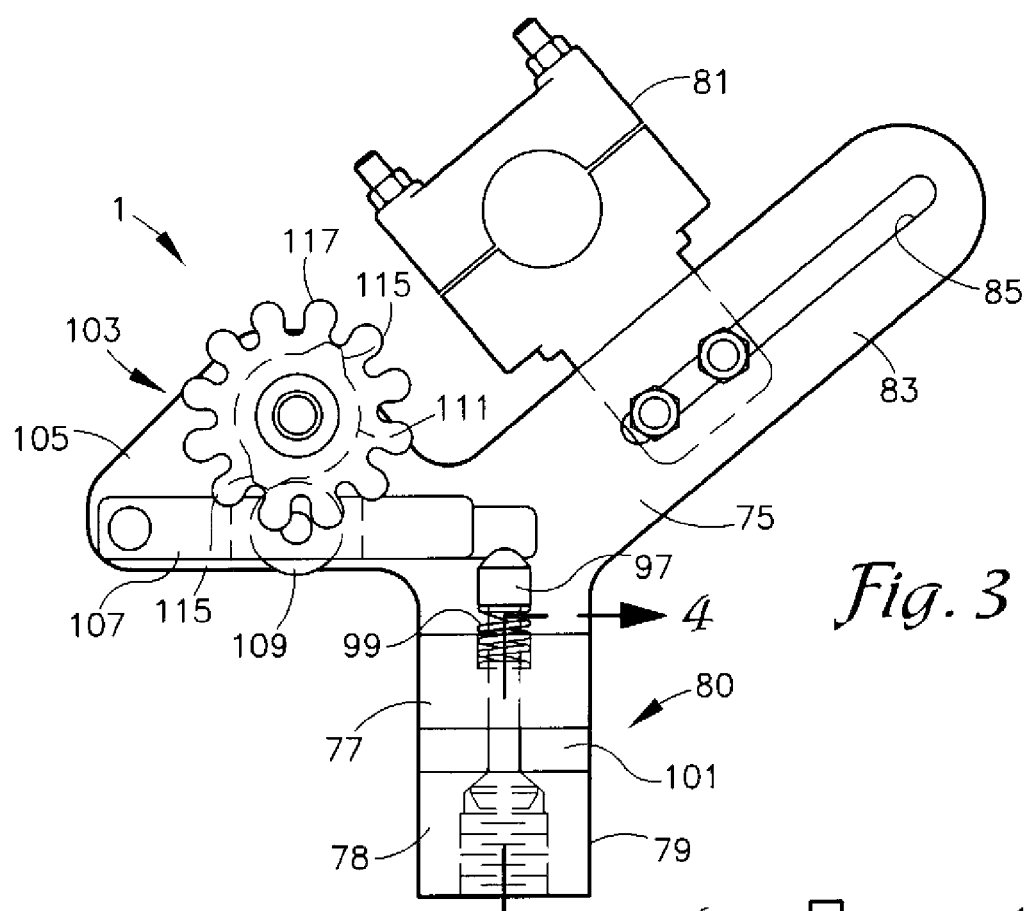
FIG. 3 is top plan view of the trigger mechanism which embodies the present invention.
Figure 4:
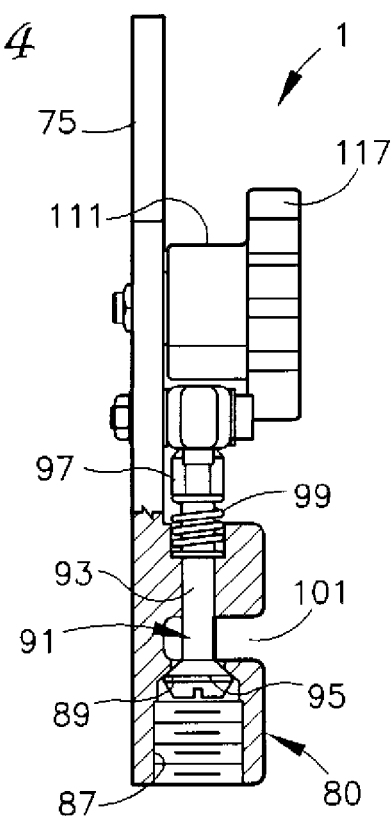
FIG. 4 is an end elevational view of the trigger mechanism with portions broken away to illustrate details thereof.

Referring to FIGS. 3 and 4, the trigger mechanism 1 includes a bracket or frame 75 having a somewhat Y-shaped configuration in the illustrated mechanism 1, although other shapes are conceivable. The frame 75 is formed by a plate having enlargements 77 and 78 on a release valve leg 79 of the frame 75 having a trigger valve assembly 80 mounted thereon. A mounting clamp assembly 81 is connected to a mounting leg 83 of the frame 75. The mounting leg 83 has a slot 85 formed therein which enables the clamp assembly to be adjustably positioned along the mounting leg 83. The clamp assembly 81 is connected to the lower shaft 24 of the air tank 14 so that the trigger mechanism 1 is rotated with the air tank 14.

A valve bore 87 is formed in an outer enlargement 78 of the valve leg 79 and terminates in a trigger valve seat 89. The valve bore 87 is threaded to receive a fitting (not shown) on an end of the release line 64. An inner enlargement 77 is also bored to receive a trigger valve member 91. The trigger valve member 91 includes a valve stem 93, a valve head 95 at an outer end, and a striker head 97 at an opposite inner end. The valve head 95 is urged into sealing relation with the valve seat 89 by a valve return spring 99 and by the pressure of compressed air within the release line 64. The spring 99 is engaged between the striker head 97 and the inner enlargement 77. A spacing between the inner and outer enlargements 77 and 78 forms an air release port 101 through which compressed air from the release line 64 exhausts when the valve head 95 is urged to a release position and unseated from the valve seat 89.

An indexing assembly 103 is mounted on an indexing leg 105 of the frame 75. The indexing assembly 103 includes a trigger arm 107 which is pivotally connected at one end to the trigger frame 75. An opposite end of the arm 107 engages the striker head 97. A cam follower roller 109 is mounted on the trigger arm 107 at a middle portion thereof and engages a rotary trigger cam member 111 which is rotatably mounted on the indexing leg 105 of the frame 75. The illustrated cam 111 has a pair of trigger cam lobes 115 which are diametrically spaced on the cam 111. A trigger pinion gear 117 is joined to the cam member 111 and rotates with the cam. The pinion gear 117 meshes with a spur gear 120 (FIG. 2) which is secured in a stationary position in coaxial relation the lower shaft 24 of the air tank 14. Thus, rotation of the trigger mechanism 1 with the air tank 14 causes the pinion gear 117 to rotate relative to the trigger frame 75, thereby rotating the trigger cam 111. Rotation of the cam 111 periodically brings the cam lobes 115 into engagement with the follower 109 of the trigger arm 107, thereby urging the trigger valve member 91 into its release position whereby compressed air within the release line 64 is exhausted and the main diaphragm valve 49 is opened.

Referring to FIG. 2, the gear ratio between the pinion gear 117 and the spur gear 120 is selected to control the frequency of releases of bag cleaning pulses. The cam lobes 115 are synchronized with the position of the distribution arm 16 so that the pulses are released while the nozzles 18 are positioned over a group of filter bags 4. The use of a cam 111 with a pair of lobes 115 enables two releases of air pulses to occur for each rotation of the cam 111. Because of this, it is possible to rotate the air tank 14 and distribution arm 16 and one half the speed that would be required with a single lobed cam. With a slower sweep speed of the distribution arm 16, the dwell time of the nozzles 18 over a particular group of bags 4 is increased which increases the cleaning efficiency.

It is to be understood that while certain forms of the present invention have been illustrated and described herein, it is not to be limited to the specific forms or arrangement of parts described and shown.

What is claimed and desired to be secured by Letters Patent is:

1. A trigger mechanism for triggering release of filter bag cleaning pulses of compressed air from an air tank communicating with a radial air distribution arm rotating about an arm axis within a filter apparatus including a plurality of filter bags positioned in circumferentially spaced groups, said tank including a tank valve controllable to release said pulses of compressed air through said air distribution arm which includes a plurality of nozzles arranged thereon to periodically register with said groups of filter bags, said tank valve being a tank diaphragm valve and being controlled to release said pulses in response to reduction in air pressure on one side of said tank valve, said trigger mechanism comprising:
   (a) a fixed gear secured in coaxial relation with said arm axis;
   (b) a trigger frame secured to said distribution arm to rotate therewith;
   (c) a trigger assembly mounted on said frame to enable movement between a sealing position and a release position, said trigger assembly being urged toward said sealing position by a combination a trigger spring member and by compressed air and being engaged with said tank valve in such a manner as to cause said tank valve to open when said trigger assembly is moved to said release position, thereby releasing said air pressure acting against said trigger assembly and causing said reduction in air pressure on one side of said tank valve;
   (d) a rotary trigger cam journaled on said frame and including a trigger gear meshed with said fixed gear whereby rotation of said arm causes rotation of said trigger cam relative to said frame, said trigger cam having two diametrically opposed cam lobes which periodically engage said trigger assembly in such a manner as to periodically push said trigger member from said sealing position to said release position; and
   (e) said fixed gear and said trigger gear being relatively sized and synchronized in such a manner as to time engagement of said cam lobes with said trigger assembly substantially simultaneous with registration of said nozzles with a selected group of said filter bags whereby said bag cleaning pulses of air are periodically applied to each of said filter bags.

2. A mechanism as set forth in claim 1 wherein a secondary valve fluidically communicates with said tank valve, receives compressed air from said air tank through said tank valve, and controls operation of said tank valve to release compressed air from said tank through said distribution arm by release of compressed air from said secondary valve, and said mechanism including:
   (a) a trigger valve formed on said trigger frame, including a trigger valve seat, and having compressed air communicated thereto from said secondary valve;
   (b) said trigger assembly including a trigger valve head which sealing engages said valve seat in said sealing position, said trigger assembly being urged toward said sealing position by said trigger spring and by said compressed air communicated to said trigger valve; and
   (c) said trigger assembly cooperating with said trigger cam to move said trigger valve head to said release position to thereby open said trigger valve and release compressed air therethrough in response to engagement of one of said cam lobes with said trigger assembly to thereby cause opening of said tank valve by said secondary valve.

3. A mechanism as set forth in claim 1 and including:
   (a) said air tank being structurally connected to said distribution arm to enable rotation of said tank with said distribution arm about said arm axis.

4. A mechanism as set forth in claim 1 wherein said trigger assembly includes:
   (a) a trigger arm pivotally connected to said trigger frame, having a cam follower thereon engaged by said trigger cam, and having a free end; and
   (b) a trigger plunger mounted on said trigger frame for reciprocal movement between said sealing position and said release position, having said trigger spring member engaged therewith to urge said trigger plunger toward said sealing position, and having said free end of said trigger arm engaged therewith whereby engagement of one of said cam lobes with said cam follower urges said trigger plunger toward said release position.

5. A trigger mechanism for triggering release of filter bag cleaning pulses of compressed air from an air tank including a distribution arm and rotating about a tank axis on a rotated shaft within a filter apparatus including a plurality of filter bags positioned in circumferentially spaced groups, said tank including a tank valve controllable to release said pulses of compressed air through said radial air distribution arm which includes a plurality of nozzles arranged on said distribution arm to periodically register with said groups of filter bags, said tank valve being a tank diaphragm valve and being controlled to release said pulses in response to reduction in air pressure on one side of said tank valve, said trigger mechanism comprising:
   (a) a fixed gear secured in coaxial relation with said tank axis;
   (b) a trigger frame secured to said rotated shaft to rotate with said tank;
   (c) a trigger assembly mounted on said frame to enable reciprocating movement between a sealing position and a release position, said trigger assembly being urged toward said sealing position by a combination of a spring member and air pressure and being engaged with said tank valve in such a manner as to cause said tank valve to open when said trigger assembly is moved to said release position, thereby releasing said air pressure acting against said trigger assembly and causing said reduction in air pressure on one side of said tank valve;
   (d) a rotary trigger cam journaled on said frame and including a trigger gear meshed with said fixed gear whereby rotation of said tank causes rotation of said trigger cam relative to said frame, said trigger cam having two diametrically opposed cam lobes which periodically engage said trigger assembly in such a manner as to periodically push said trigger assembly from said sealing position to said release position; and
   (e) said fixed gear and said trigger gear being relatively sized and synchronized in such a manner as to time engagement of said cam lobes with said trigger assembly substantially simultaneous with registration of said nozzles with a selected group of said filter bags whereby said bag cleaning pulses of air are periodically applied to each of said filter bags.

6. A mechanism as set forth in claim 5 wherein a secondary valve fluidically communicates with said tank valve, receives compressed air from said air tank through said tank valve, and controls operation of said tank valve to release compressed air from said tank through said distribution arm by release of compressed air from said secondary valve, and said mechanism including:

(a) a trigger valve formed on said trigger frame, including a trigger valve seat, and having compressed air communicated thereto from said secondary valve;

(b) said trigger assembly including a trigger valve head which sealing engages said valve seat in said sealing position, said trigger assembly being urged toward said sealing position by said trigger spring and by said compressed air communicated to said trigger valve; and (c) said trigger assembly cooperating with said trigger cam to move said trigger valve head to said release position to thereby open said trigger valve and release compressed air therethrough in response to engagement of one of said cam lobes with said trigger assembly to thereby cause opening of said tank valve by said secondary valve.

7. A mechanism as set forth in claim 5 wherein said trigger assembly includes:

(a) a trigger arm pivotally connected to said trigger frame, having a cam follower thereon engaged by said trigger cam, and having a free end; and (b) a trigger plunger mounted on said trigger frame for reciprocal movement between said sealing position and said release position, having said trigger spring member engaged therewith to urge said trigger plunger toward said sealing position, and having said free end of said trigger arm engaged therewith whereby engagement of one of said cam lobes with said cam follower urges said trigger plunger toward said release position.

8. A trigger mechanism for triggering release of filter bag cleaning pulses of compressed air from an air tank including a radial air distribution arm and rotating about a tank axis on a rotated shaft within a filter apparatus including a plurality of filter bags positioned in circumferentially spaced groups, said tank including a tank valve controllable by release of compressed from a secondary valve to release said pulses of compressed air through a radial air distribution arm which includes a plurality of nozzles arranged on said distribution arm to periodically register with said groups of filter bags, said tank valve being a tank diaphragm valve and being controlled to release said pulses in response to reduction in air pressure on one side of said tank valve, said trigger mechanism comprising:

(a) a fixed gear secured in coaxial relation with said tank axis;

(b) a trigger frame secured to said rotated shaft to rotate with said tank;

(c) a trigger valve formed on said frame, including a trigger valve seat, and having compressed air communicated thereto from said air tank by way of said secondary valve;

(d) a trigger assembly mounted on said frame to enable reciprocating movement between a sealing position and a release position, said trigger assembly including a trigger valve head which sealingly engages said trigger valve seat in said sealing position, said trigger assembly being urged toward said sealing position by a valve spring member and by compressed air communicated from said secondary valve and cooperating with said secondary valve in such a manner as to cause said tank valve to open when said trigger assembly is moved to said release position, thereby releasing said compressed air acting against said trigger assembly and causing said reduction in air pressure on one side of said tank valve;

(e) a rotary trigger cam journaled on said frame and including a trigger gear meshed with said fixed gear whereby rotation of said tank causes rotation of said trigger cam relative to said frame, said trigger cam having two diametrically opposed cam lobes which periodically engage said trigger assembly in such a manner as to periodically push said trigger member from said sealing position to said release position; and (f) said fixed gear and said trigger gear being relatively sized and synchronized in such a manner as to time engagement of one of said cam lobes with said trigger member substantially simultaneous with registration of said nozzles with a selected group of said filter bags whereby said bag cleaning pulses of air are periodically applied to each of said filter bags.

9. A mechanism as set forth in claim 8 wherein said trigger assembly includes:

(a) a trigger arm pivotally connected to said trigger frame, having a cam follower thereon engaged by said trigger cam, and having a free end; and (b) a trigger plunger mounted on said trigger frame for reciprocal movement between said sealing position and said release position, having said trigger valve had positioned at one end thereof, having said trigger spring member engaged therewith to urge said trigger valve head into sealing engagement with said valve seat in said sealing position, and having said free end of said trigger arm engaged with and opposite said valve head whereby engagement of one of said cam lobes with said cam follower urges said trigger plunger toward said release position.

\* \* \* \* \*